United States Patent [19]
Edstrom et al.

[11] 4,310,895
[45] Jan. 12, 1982

[54] PLURAL NULL DIGITAL INTERCONNECTIONS

[75] Inventors: Gene H. Edstrom, Cortez, Colo.; Paul H. Paulsen, Tucson, Ariz.

[73] Assignee: International Business Machines Corporation, Armonk, N.Y.

[21] Appl. No.: 90,805

[22] Filed: Nov. 2, 1979

[51] Int. Cl.³ .............................................. G06F 3/00
[52] U.S. Cl. .............................. 364/900; 340/825.57; 371/34
[58] Field of Search ... 364/200 MS File, 900 MS File; 340/150, 147 R; 371/34; 178/3

[56] References Cited

U.S. PATENT DOCUMENTS

| | | | |
|---|---|---|---|
| 3,297,994 | 1/1967 | Klein | 364/200 |
| 3,303,476 | 2/1967 | Moyer et al. | 364/200 |
| 3,400,371 | 9/1968 | Amdahl et al. | 364/200 |
| 3,585,599 | 10/1971 | Hitt | 364/200 |
| 3,611,311 | 8/1969 | Andrews | 364/200 |
| 3,654,617 | 4/1972 | Irwin | 384/200 |
| 3,828,326 | 6/1974 | Cash | 364/200 |
| 4,017,839 | 4/1977 | Calle et al. | 364/200 |
| 4,041,473 | 8/1977 | Bardotti et al. | 364/200 |
| 4,100,601 | 7/1978 | Kaufman et al. | 364/200 |
| 4,100,605 | 7/1978 | Holman | 364/900 |

OTHER PUBLICATIONS

Moe, IBM Technical Disclosure Bulletin, vol. 21, #5, 10-78, p. 2009.
Moyer et al., IBM Technical Disclosure Bulletin, vol. 20, #1, 6-77, p. 301.
IBM Technical Disclosure Bulletin, vol. 22, #10, 3-80, p. 4427.
IBM Systems Reference Library, File No. S/360-19, Form A22,-6843-3, New York.

*Primary Examiner*—Gareth D. Shaw
*Assistant Examiner*—Eddie P. Chan
*Attorney, Agent, or Firm*—Herbert F. Somermeyer

[57] ABSTRACT

Apparatus and method for interconnecting a controlling unit and a controlled unit include providing a plurality of operational nulls. One of the nulls is a logically disconnected null; another of the nulls is a logically connected null. All operations proceed in a predetermined sequence from either of the two nulls. The two units interchange signals indicating the interconnecting state; that is, both units supply the null signal simultaneously except when there is a desire by one of the units to change to another operational state. Unique status recovery procedures and apparatus are disclosed that enable recovery of status and emergency control of units during error prone or degraded operations. All of the functions are based upon an encoded set of tag signals being exchanged. For reliability purposes, complementary tag signal combinations provide diverse functions.

31 Claims, 21 Drawing Figures

TAG OUT STATES

TAG IN STATES

PLURAL NULL DIGITAL INTERCONNECTIONS

DOCUMENTS INCORPORATED BY REFERENCE

U.S. Pat. Nos. 3,400,371 and 3,303,476 are incorporated to show multi-tagged connections having bit significant tag lines. These documents also show control unit structures into which the present invention can be incorporated.

U.S. Pat. No. 4,100,605 shows a status reporting system usable with the present invention.

U.S. Pat. No. 3,654,617 shows a control unit with which the present invention may be advantageously employed.

U.S. Pat. No. RE28,265 shows a portion of a control unit illustrating data transfer operations controlled by tag line signals.

BACKGROUND OF THE INVENTION

The present invention relates to methods and apparatus for providing digital communications between a plurality of independently operating units. In particular, such interconnections employ tag or control lines operatively associated with data bus lines.

In data processing installations, host computers have input-output connections to a plurality of control units or directors which in turn are connected to a hierarchy of input-output devices. Such interconnections can be multi-pathed and highly flexible for providing a large diversity of functions with varying capacities. The connections from the host computers to the input-output control units or directors have been developed to be highly reliable, highly flexible and to have high data rates. Such interconnections are expensive and the expense is justified as between a host computer and its group of input-output directors. An example of such input-output connection is the input-output connections provided by the IBM 370 series computers, manufactured by International Business Machines Corporation, Armonk, New York. That set of interconnections provide for a plurality of tag lines which define, in a so-called "handshaking manner", the operational interrelationship between a host computer and a selected director. In general, a single tag line will carry a single tag signal such as OPERATION OUT, SELECT OUT, SERVICE OUT, DATA OUT and the like.

A similar type of interconnection is required between each of the input-output or peripheral directors/control units and their respective connected input/output devices; such as printers, record disk apparatus, communication modems, tape units and the like. Generally, the cost justification for the director to device unit connection is not as high as for the host-to-director interconnection. Accordingly, it has been the practice in the connections from the device to the control unit to simplify the connection such that a smaller cable can be used with fewer controls. Generally, the operational interrelationship between a director and its connected devices is much simpler than between the host and the directors; that is, the communications or interconnection protocols can be simpler because of the simplified relationship. For example, in the connection cable between a host computer and a director, there can be 96 wires (physically divided into two cables/connectors) of which 40 (20 signals with ground wires) are used for tag lines and 18 are used for data bus lines, 9 wire pairs for a bus out and 9 wire pairs for a bus in. The connection from a director to a device on the other hand can be achieved by a mere 24 lines. Such a connection is exemplified by the teaching in U.S. Pat. No. 3,654,617.

With the advent of large scale integration, microprocessors, programmable logic arrays on a chip, and the like, the device control and the director control have become much more complex and expensive. For example, a device may be microprocessor controlled with the control program being loaded into a microprocessor random access control unit from a tape unit or disk. In a similar manner, a director can have one or more microprocessors with a plurality of programmable logic arrays, all of which have volatile control memories and are loaded as described for the device microprocessor. Such microprocessor PLA's (programmable logic arrays) and the like perform the logic of operation for the directors and device. Such logic of operation is now becoming very, very complex requiring a greater complexity into interrelationship between a director and a device. Yet for cost control reasons, it is desired not to create a larger cable for accommodating this increased subsystem (director-device configuration) complexity. Accordingly, an improved method and apparatus must be provided for accommodating such increased complexity without substantially adding to the interconnection costs.

Further, error conditions and error recovery become much more feasible with program logic than with fixed logic. Also, the probability of error in a more complex subsystem is higher. Therefore, the ability to automatically detect an error condition, get error status information and recover from error conditions over the same 24 lines or less becomes an important aspect of subsystem capabilities.

The resulting operational interrelationships between a host computer and its director also become more complex. Accordingly, it is also desired to enhance the operational interrelationship between the host and the director by creating a greater interconnection capability without substantial added cost.

SUMMARY OF THE INVENTION

It is an object of the present invention to provide enhanced interconnections between a plurality of units, in particular between a controlling unit and a controlled unit.

Tag signals, i.e., control signals, are encoded in a manner that a first state of the encoded signals represents a disconnected logical null and the complement of such signal state represents a connected or selected null. All changes in tag signals follow the so-called "Gray" coding wherein only one signal or bit position is changed at a time. Accordingly, between the disconnected and selected null states, there is at least one intermediate state. Such intermediate state, in accordance with another aspect of the invention, is used for a selection step as well as a timing signal for transferring signals and commands between the two units.

A plurality of other control or tag states are provided which enable acquisition of status information and the exercise of unusual control over a controlled unit whenever the dual-null interconnection is not fully operative for one reason or another. Special sequences of encoded tag signals enable the controlling unit to activate special circuits and controls within the controlled unit to bypass the normal path of control and data flow. This includes device control.

In another aspect of the novel interconnection, the data bus or signal lines used normally for transferring data and command signals between the units are used for timing signals and serially transmitted signals, as opposed to parallel transmitted signals, under one of two complementary tag signal states. Such signal states are not used during normal operations. Using the complement enables a maximal probability of successful recovery during adverse error conditions.

Therefore, in one aspect of the present invention, a plurality of tag or control lines extend between a plurality of units. The tag lines carry signals encoded preferably in accordance with the Gray code with the signal state of the tag or control line being interpreted as having a plurality of nulls wherein the nulls indicate quiescent operational states of the units. A first null indicates a disconnected quiescent state whereas a second null indicates an operationally and logically connected state wherein units are logically interconnected with no activity. The signal states of the tag lines indicate the disconnected and connected nulls by encoded binary signal states which are the binary complements. It is preferred that one or more intermediate signal states on the tag line be required in moving from one null state to another null state. Such intermediate or third signal state can also be used for timing signal transfers between the units.

In another aspect of the invention, a set of signal states on the tag lines indicates command and unusual functions, such as diagnostic functions. Particular tag sequences, which are modifications of the so-called Gray code, selectively sequences auxiliary circuits in an addressed unit for bypassing possibly error ridden portions of the addressed unit. Particular auxiliary sequences, all controlled by the tag line signals, are employed to recover from error conditions. In particular, a data bus connects the units for transferring command signals and data signals. In a degraded mode, using the auxiliary tag control signal, the data bus is used as a timing signal source and as a serial data transfer path as opposed to parallel data transfers. Such redundancy enables recovery under severe error conditions in an addressed unit.

The foregoing objects, features and advantages of the invention will be apparent from the following more particular description of preferred embodiments of the invention, as illustrated in the accompanying drawings.

THE DRAWING

Figure 1:
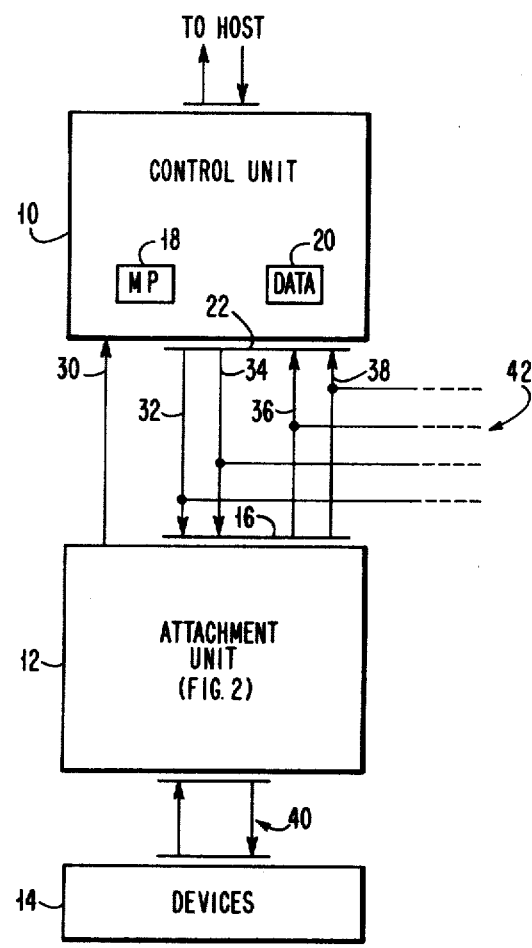
FIG. 1 is a diagrammatic showing of a subsystem in which the invention may be advantageously practiced.

FIGS. 6-15 are timing diagrams illustrating diverse signal sequences employed in practicing the present invention in the FIG. 1 illustrated subsystem. Respectively, FIGS. 6-15 illustrate a poll sequence, select sequence, command sequence, write data sequence, read data sequence, end of operation sequence, deselect sequence an RCC-1 sequence (recovery connection circuit) an RCC-2 sequence (alternate recovery connection circuit) and a hardware immediate sequence.

Figure 16:
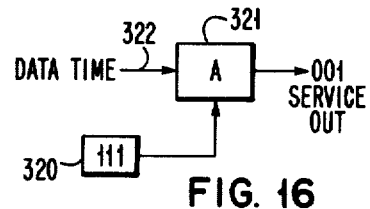

FIG. 16 is a simplified logic diagram showing a tag signal generation circuit usable with the present invention.

Figure 17:
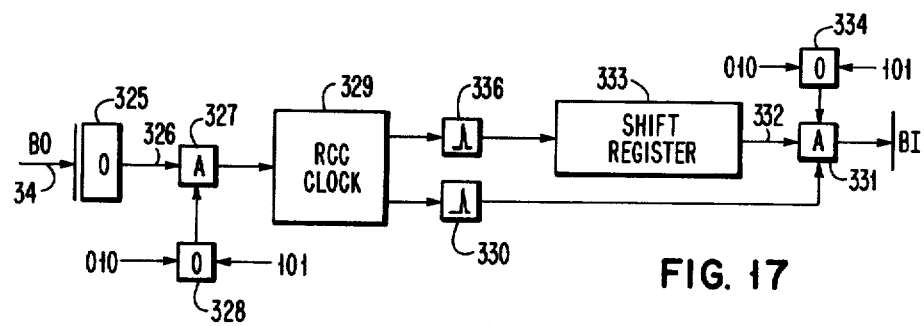

FIG. 17 is a simplified showing of diagnostic RCC circuits usable with the present invention.

Figure 18:
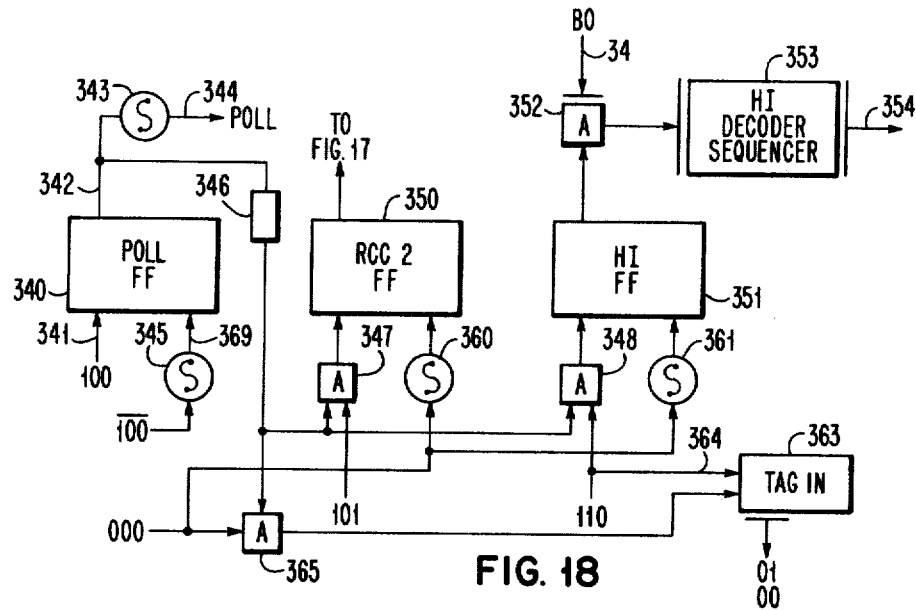

FIG. 18 is a logic diagram of diagnostic status-reporting circuits usable with the present invention.

Figure 19:
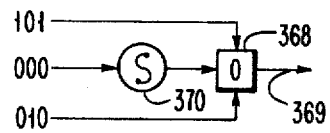

FIG. 19 shows an alternate poll tag control response circuit usable with the present invention.

Figure 20:
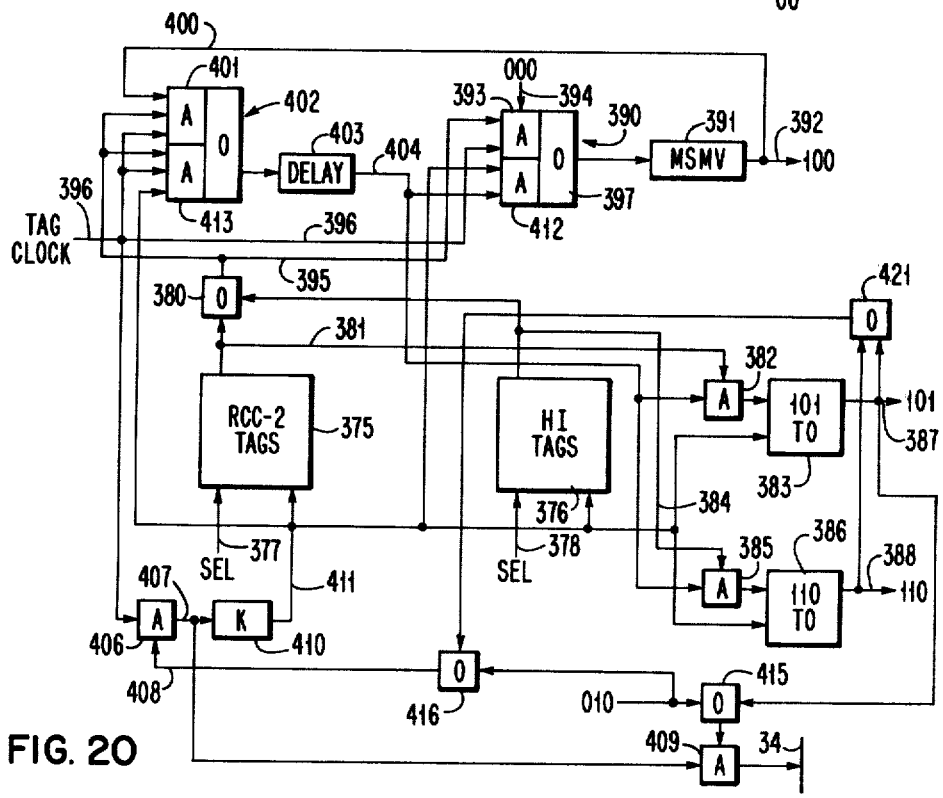

FIG. 20 illustrates diagnostic tag sequence generation circuits.

Figure 21:
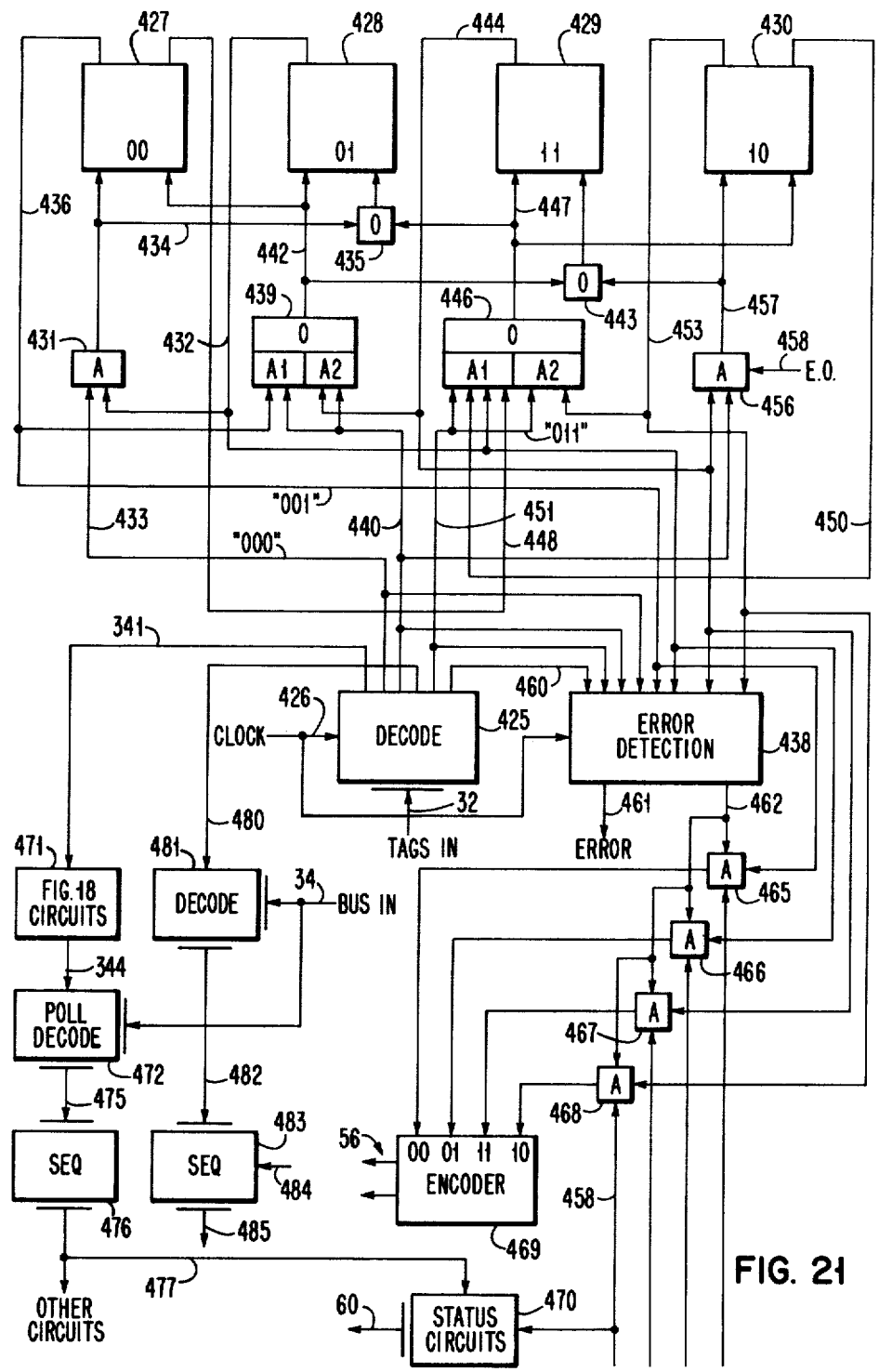

FIG. 21 is a logic diagram of tag circuits which includes a showing of the logic for generating and decoding tag signals.

DETAILED DESCRIPTION

Referring now more particularly to the accompanying drawing, like numerals indicate like parts and structural features in the various diagrams. The present invention is advantageously employed in a so-called subsystem to be attached to a data processing host or hosts. Such hosts are commonly referred to as central processing units, CPU's, or computers. Such subsystems are connected to the host via well-known channels which provide high speed, highly reliable digital communications between the subsystem and the host computers. Such subsystems may employ one or more devices, such as magnetic tape recorders, magnetic disk recorders, impact printers, non-impact printers, modems for connections to communication network and the like. Implementation of the invention in such a subsystem is best understood by referring to FIG. 1 wherein a control unit 10 is connected via the above-mentioned channels to a host computer. U.S. Pat. No. 3,654,617 illustrates the arrangement of such a control unit for a subsystem. The control unit in turn is connected to a so-called attachment unit or attachment circuit 12. Unit 12 provides logic and timing functions for operationally interconnecting control unit 10 to one or more devices 14. Attachment unit 12 embodies a main portion of the present invention as detailed in FIG. 2.

Figure 2:
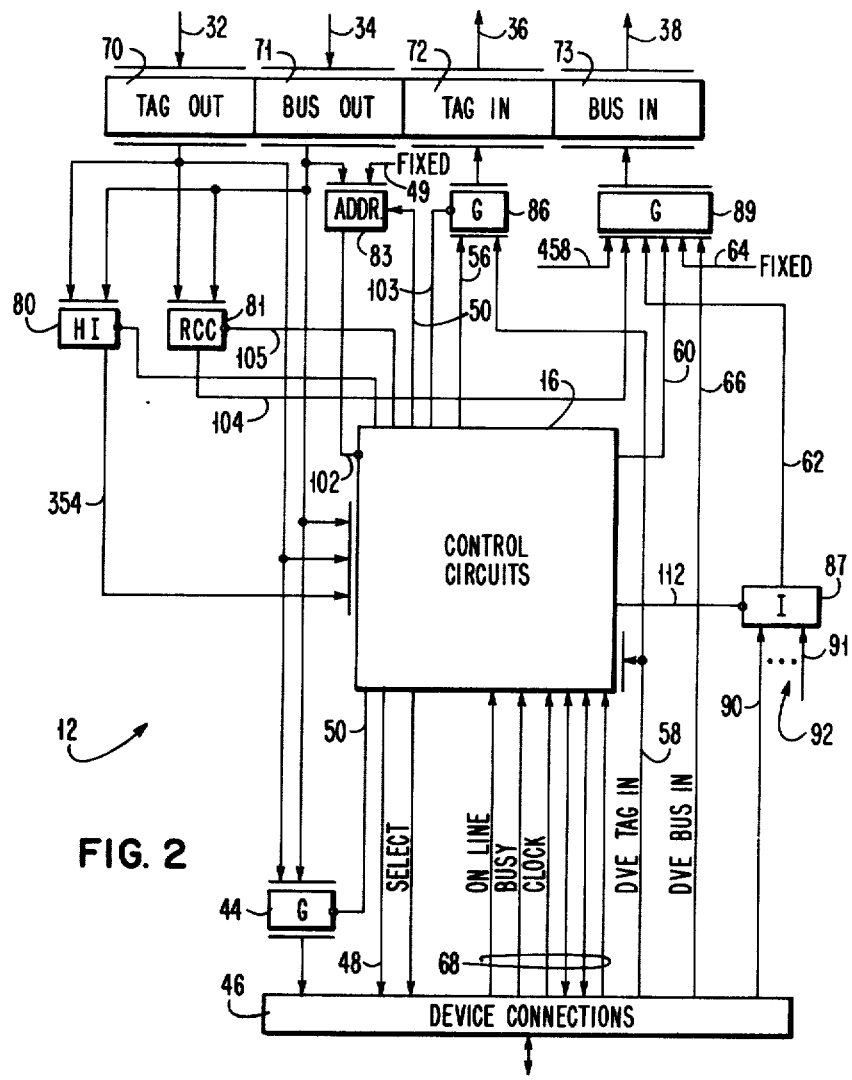
FIG. 2 is a general arrangement of an attachment circuit usable in the FIG. 1 illustration which particularly illustrates some important aspects of the present invention.
Figure 13:
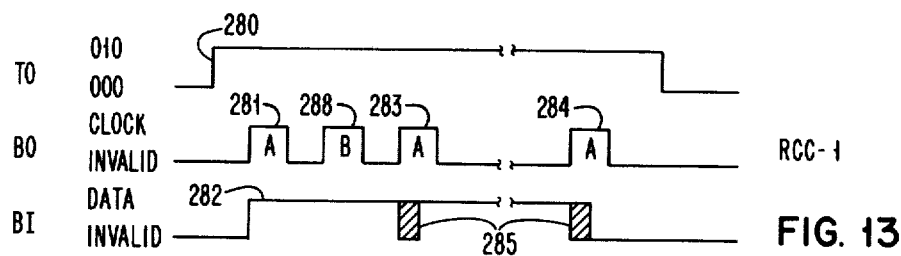
Figure 14:
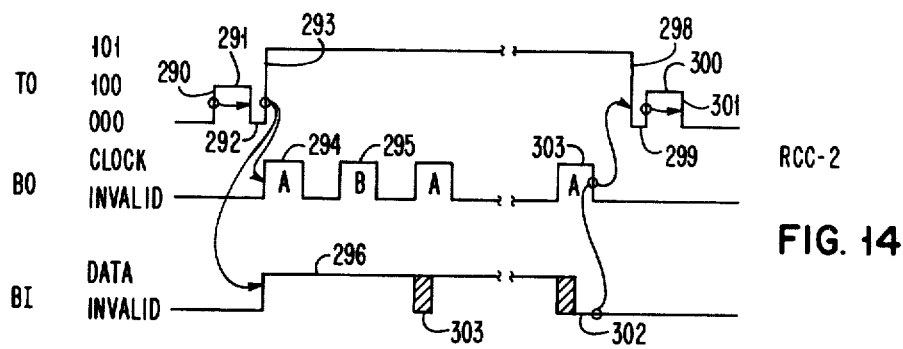

Before proceeding to the FIG. 2 description, the control unit 10, as set forth in U.S. Pat. No. 3,654,617 includes a microprocessor MP 18 as well as data circuits 20. Microprocessor 18 provides supervisory and control functions within control unit 10. Included in these functions are preliminary control functions establishing digital data communication between the host and the subsystem, which communication is completed by a digital data signal path including data circuits 20, attachment unit 12, and devices 14. The tag or control signals of the present invention are advantageously employed between control unit 10 and attachment unit 12. Such interconnection is via a cable represented by a cable connector 16 at attachment unit 12 (a horizontal line representing the connector) and a similar connector 22 at control unit 10. A plurality of electrical lines extend between connectors 16 and 22. So-called outgoing lines; i.e., lines that carry signals only from control unit 10 to attachment unit 12, include a set of tag signal lines 32 and data out bus lines 34. In the illustrated implementation, there are three tag lines 32 and nine data out bus lines 34. In a similar manner, lines 36 and 38 carry signals from attachment unit 12 to control unit 10. In the present implementation, the tag in lines 36 have two signal conductors whereas the data in bus lines 38 have nine signal conductors. Additionally, an attention or interrupt line 30 extends from attachment unit 12 to control unit 10. In a similar manner, attachment unit 12 is connected to devices 14 via cable 40. Control unit 10 can be attached to a plurality of attachment units 12 as indicated by the dashed lines 42 extending from lines 32, 34, 36 and 38. Other attachment units 12, of course, would also have their own attention line comparable and connected in a logic OR relation to attention line 30 of attachment unit 12. OR circuit 41 of U.S. Pat. No. 4,100,605 illustrates this connection. Activating the attention line 30 signals control circuits 16 that an RCC sequence, as shown in FIGS. 13, 14 and 17 is requested. The device is indicating a possible detected error in the interconnection. Attachment unit 12 has also been referred to as "A-Box" and as an attachment controller.

In accordance with the invention, when all tag signals are binary zero's, a logical disconnected null interconnection state is indicated. A binary zero is a no-energy or low-energy circuit state, such as ground potential. When all tag signals, except as hereinafter described are all binary 1's, a logical connected null state is indicated. These two null states enhance interconnection operations as will become apparent.

Referring next to FIG. 2, the internal constructional features of attachment unit 12 important to the understanding of the present invention are set forth below.

Referring to FIG. 2, the cable lines 32, 34, 36 and 38 respectively are connected to a plurality of registers denominated as tag out register 70, bus out register 71, tag in register 72 and bus in register 73. The tag or control signals received over cable lines 32 are transmitted by tag out register 70 to control circuits 16 for decoding, as will later be described. Additionally, the tag out signals are selectively gated through a set of gates 44 thence through a set of amplifiers, labeled device connections 46, to devices 14. The tag out register 70 signals also go to a pair of recovery and diagnostic circuits HI 80 and RCC 81. HI 80 is a hardware immediate circuit which responds jointly to the signals from tag out register 70 and bus out register 71 to effect additional control over control circuits 16. This action usually occurs whenever the control circuits 16's normal circuit function is degraded or error prone. Such additional functions include turning off the devices 14; for example, when a device 14 is a magnetic tape recorder, the HI 80 circuit can be actuated by the combination of signals from tag out register 70 and bus out register 71 for insuring that the recorder is turned off. Such control can be effected by circuits from control circuits 16 sending a turn off signal over line 48 or alternatively actuating gate 44 via an activating signal on line 50 to pass the tag out and bus out signals through device connections 46.

RCC 81 is a recovery connection circuit for recovering status signals from attachment unit 12 when severe error conditions occur. For example, the apparatus shown in U.S. Pat. No. 4,100,605 may be employed in connection with RCC 81, as will become apparent. Control circuit 6 may supply supplementary control signals over line 105 to RCC 81. These operations are described in detail later with respect to FIG. 17.

Bus out register 71 receives bus out signals from bus out lines 34. These signals may be data signals, command signals, and the like. From bus out register 71, the received signals are transmitted to HI 80 and RCC 81, as above referred to. In addition, the bus out 71 register signals are applied to address detection circuits 83. Each attachment unit 12 will have a fixed address which is plugged by a pin board or a plug board in the usual manner. Such fixed address signals are supplied over lines 49 to address circuit 83. When the tag out signal from register 70 supplied to control circuit 16 indicates an addressing function, such as a poll, then the decoding of the tag signals by control circuit 16 results in an activating signal being supplied over line 50 to activate address circuits 83. Address circuits 83 then compare the bit pattern represented by the bus out register 71 signals and the fixed address signal supplied over line 49. When there is a favorable compare, then control unit 10 is addressing attachment unit 12. Accordingly, address circuits 83 then supply an address compare signal over line 102 for enabling control circuit 16 to respond in a poll or other sequence, as later described.

The bus out register 71 signals are also transferred to control circuits 16 for command decoding, as is well known in the data processing art. When devices 14 have elaborate controls, the commands from bus out register are transferred via gates 44 to an addressed device 14 for its decoding and response. Further, the bus out register 71 signals are also supplied to gates 44 for transmission to devices 14 via device connections 46.

The tag-in register 72 supplies the tag-in signals over the two tag-in lines 36. The tag-in signals contained in register 72 can be generated as shown in FIG. 21. In FIG. 2, such tag-in signals are transmitted to register 72 via a pair of gates 86. Control circuits 16 supply a gate-activating signal over line 103 to gates 86 for passing the generated tag-in signals over lines 56 from control circuits 16, as later explained with respect to FIG. 21. The devices 14 can also supply tag-in signals over a pair of lines 58 to control circuits 16. These device tag in signals also can be transmitted by gates 86 under control of control circuits 16. In other words, gates 86 constitute 4 individual AND gate circuits. Two of the AND gate circuits pass signals from lines 56 while the other two AND circuits pass signals from lines 58, all under control of signals supplied over lines 103.

In a similar manner, gates 89 supply signals to bus-in register 73 for transmission over data bus-in lines 38. Control circuits 16 supply a plurality of control signals over lines 60 to gates 89 for selectively gating signals over a single line 104 from RCC 81, over a set of lines 62 from interrupt handling circuit 87, over lines 64 or from a device bus 66. The fixed signals on lines 64 are address signals representing the address of attachment unit 12; that is, when the aforedescribed address circuits 83 supply an address compare signal over line 102, control circuits 16 may be activated to supply the same address signal to the control unit 10 over data bus in lines 38. It should be noted that the fixed address represented by the signals on lines 64 is the fixed address represented by the signals on lines 48 and can be generated by the same plug circuit or by an independent plug circuit. It is preferred that the response be a three-bit address, a complement of the three bit address and busy status bits.

Interrupt circuits 87 are enabled by a signal from control circuits 16 received over line 112. Interrupt circuits 87 handle interrupts in a known manner, all as received from a plurality of devices 14 as represented by the line 92 and lines 90-91. Since interrupt handling is so well-known and not pertinent to the practice of the present invention, further description is dispensed with. The interrupt will usually result in a POLL sequence for obtaining status, such as ending status for a device that activated its interrupt line.

It is to be appreciated that the interconnection between the attachment unit 12 and its controlled devices 14 requires a large plurality of control signals and lines. Accordingly, for simplicity purposes, only a few of the more pertinent lines are shown. Numeral 68 represents such additional connections between unit 12 and devices 14 which would be expected to be provided in a subsystem of the type shown in FIG. 1. Functions of those lines are not pertinent to an understanding of the present invention and therefore are not described.

Figure 3:
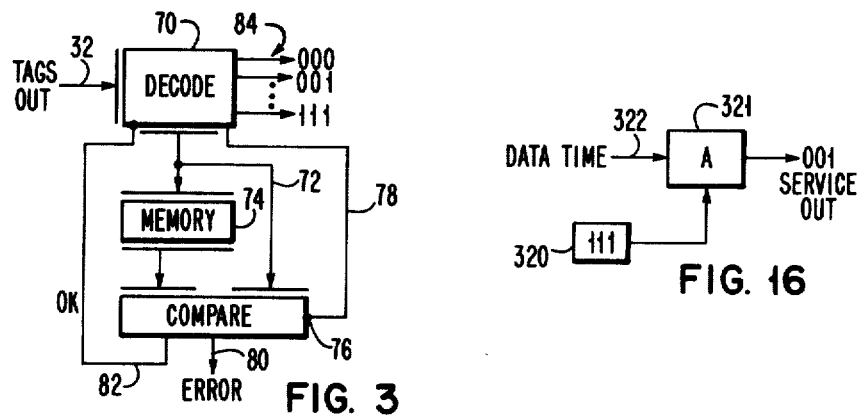
FIG. 3 illustrates tag signal decoding for use in the attachment circuits of FIG. 2.

FIG. 3 illustrates a circuit of control circuits 16 usable to decode the tag-out signals received over lines 32. In the illustrated embodiment, the tag-out lines carry three signals which have a sequence in accordance with the Gray code, as will become apparent. Signals carried over lines 32 are supplied to a decode 70 which translates or decodes the three tag signals into one of 8 decoded tag signals having binary representation 000 through 111 inclusive. Decode circuit 70 does not supply the decoded tag signals until after it verifies that the received tag signals are in a legal Gray code sequence. This verification is achieved by decode 70 supplying a set of decoded tag signals over lines 72 to be stored in a memory 74. Each time a signal or signals on lines 32 changes, decode 70 updates memory 74. However, the previous signal pattern, which is stored in memory 74, is supplied to compare circuit 76 which compares the signals on line 72 with the previously stored signals in memory 74. Decode 70 detecting a change in a signal on a line 32 supplies an activating signal over line 78 to activate compare 76. If the compare detects other than a Gray code sequence, an error signal is supplied over line 80 for error recovery procedures beyond the scope of the present description. If there is a successful compare; i.e., the transition of the tag signal state is valid, as later described, then an okay signal is supplied over line 82 to decode 70 which then emits the decoded tag signal over one of the lines 84.

Accordingly, decoding the tag-out signals from register 70 not only requires the decoding but also verification that the appropriate tag sequence and a valid tag sequence has been adhered to. This rule applies to whether the normal tag sequence has been employed, as later described, or diagnostic or unusual tag sequences are being employed. All of this checking adds to the credibility and reliability of the tag control system of the present invention. This arrangement is particularly important for the dual null tag state and the unusual recovery procedures enabled by the auxiliary tag states.

Figure 4:
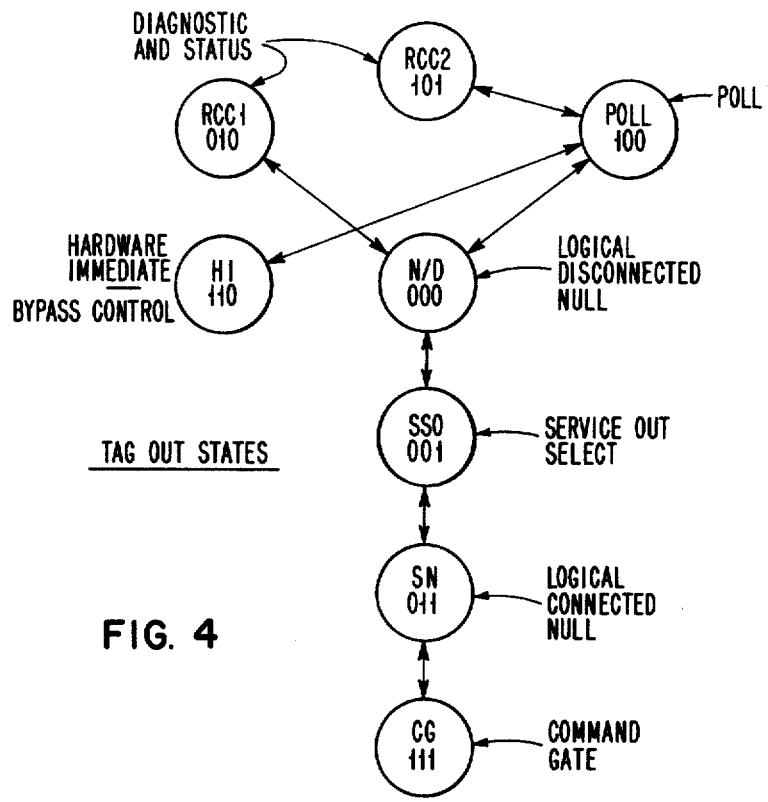
FIG. 4 illustrates tag-out states in accordance with the present invention.
Figure 5:
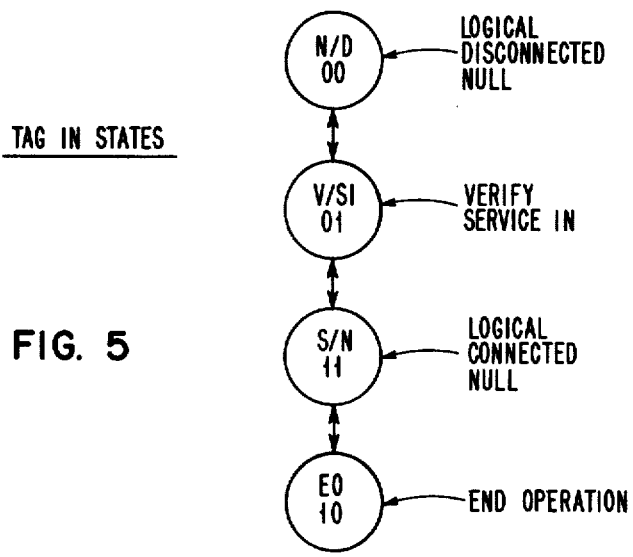
FIG. 5 illustrates tag-out states in accordance with the present invention.

Referring next to FIG. 4, the signal or tag states of the tag out lines 32 are illustrated. These signal states also represent operational states of the interconnection between control unit 10 and the addressed attachment unit 12. The binary representation of the signal states 000 through 111, respectively, corresponds to the encoded binary signal state of tag out register 70. The tag-in states shown in FIG. 5 will be separately described and are sent in response to the tag-out states of FIG. 4 as described with respect to FIGS. 6–15.

When control unit 10 has no activity whatsoever with respect to a device 14 connected to attachment unit 12, the subsystem state is a "disconnection" between the control unit 10 and devices 14. This logical (not physical) disconnection is represented by the logical disconnected null 000 which is a first tag state of the interconnection. When control unti 10 has a logical or operative relationship established with a device 14 and no activity is occurring, the signal state 011 represents a logical connected null state, also referred to as a selected null SN. Examination of the two states indicates that the right two digits 00 of the logical disconnected null are the binary complement of the right two digits of the logical connected null 11. The leftmost digit is not changed and constitutes an auxiliary tag signal to be used for control purposes, as will be more fully described.

It is desired in going from tag state to tag state that a Gray code sequence be followed. Accordingly, the select and service out state 001 is interposed between the logical disconnected null 000 and the logical connected null 011. When the tag states are proceeding from 000 to 011, transition state 001 is a select state; i.e., control unit 10 is selecting attachment unit 12. When state 001 is reached from the logical connected null 011, then state 001 is a service out state. Such service out state acts as a timing pulse for the transmission of signals over the bus-out lines 34 or the bus-in lines 38, as widely practiced in the IBM 360/370 computer input/output systems. The general sequence of operation for selecting an attachment unit 12 is to proceed from state 000 to 001. An interchange of signals occurs between attachment unit 12 and control unit 10; then the tag state proceeds to 011 for control unit 10 to indicate to attachment unit 12 that it is selected.

From the logical connected null 011, control unit 10 may direct the tag states to service out 001 for the transmission of signals between control unit 10 and transfer unit 12 or can proceed to state 111 command gate. The command gate state causes control circuits 16 to interpret the signals received over lines 34 as a command from control unit 10 for the attachment unit 12 or a device 14. Such command, when for a magnetic recorder, may include forward motion, backward motion set write mode, set read mode, etc. From the command gate state, the tag state must return to logical connect null state 011.

It should be noted that the command gate state has for the leftmost or auxiliary tag state a 1 which signifies a control function; i.e., transferring command from control unit 10 to attachment unit 12 or device 14.

The auxiliary tag signal is used in connection with diagnostics and other purposes. For example, to poll the attachment unit 12, the auxiliary tag signal is changed to a 1 while the null indicating bits 00 (right hand two bits) remain the same to generate the poll state 100. The poll operation is as used in the IBM 360/370 series computers. From the poll state 100, the tag state returns to the logical disconnected null state 000.

For diagnostic or recovery action, during an error condition in either attachment unit 12 or device 14, the poll state 100 is an intermediate state from the logical disconnected null state 000 to an RCC 2 state 101 or an HI state 110. As will later be described, the poll state 100, when transferring to an RCC 2 or HI state, is of so-called momentary duration for insuring that a poll activity does not occur. The RCC 2 state 101 activates RCC circuits 81 of FIG. 2 whereas the HI state 110 activates hardware immediate circuits 80 of FIG. 2. The state sequence for such recovery and diagnostic purposes is always from the 000 state to the momentary 100 state, then either to the 101 state or the 110 state, and then back to the 000 state via the momentary 100 state.

An additional state remains in the tag sequence. Accordingly, a RCC 1 state 010 is provided for augmenting the RCC 2 state 101. Note that the RCC 1 and the RCC 2 state are binary complements to insure that any error condition in the tag out lines 32 would not prevent recovery of appropriate data signals from attachment unit 12. The RCC 1 state is only entered from the 000 state and must return to the 000 state.

Accordingly, it is seen that the binary complement system for insuring maximum utilization of available circuitry during error condition enables reliable establishment of two null control tag states and provides reliable multiple recovery states. Therefore, maximum flexibility in recovering from error conditions is efficiently afforded by practicing the present invention.

The description of FIG. 4 only refers to the tags out from control unit 10 to attachment unit 12. As explained with respect to FIG. 2, attachment unit 12 and device 14 can supply tags in over lines 36. Since there are but two lines 36, there are four tags in states. Such four states correspond to the four states 000, 001, 011, and 111 of FIG. 4. When control unit 10 is supplying the 000 state over lines 32, attachment unit 12 is simultaneously supplying the 00 signal over lines 36 to indicate its logical disconnected null state. In this regard, a binary 0 in the interconnection scheme between control unit 10 and attachment unit 12 is a signal inactive state; therefore, for a plurality of attachment units 12, all sending in a logical disconnected null signal 00 will be logically ORed into control unit 10. Anyone of the units sending a non-zero tag in signal can signify to all units that there is at least one attachment unit 12 that is active or logically operative with control unit 10. In this regard, it should be remembered that the poll 100 state effects an address compare for activating one and only one attachment unit 12 at a time. For example, when address circuit 83 indicates a non-compare then that associated attachment unit keeps itself logically disconnected. Accordingly, when all attachment units 12 are logically disconnected from control unit 10, tag in lines 36 will be a 00.

The logical connected null state of the tags in 36 is a 11 corresponding to the complement of the logical disconnected null state 00. Such signals prevent other attachment units 12 from supplying signals over bus in lines 38. However, each attachment unit 12 has an attention line 30 corresponding to lines 90, 91 and 92 of FIG. 16 as well as an additional one of the lines 68 of FIG. 2 for special communication outside the usual interconnection communications.

Again to move from the logical disconnected null tag-in state 00 to the logical connected null tag-in state 11, an intermediate tag-in state 01 is provided. This state is a VERIFY and SERVICE IN state. The VERIFY state occurs in moving from state 00 to 01 and corresponds to the SELECT state 001 of FIG. 4. When state 01 is entered from state 11, then it represents a SERVICE IN signal corresponding to the SERVICE OUT signal of FIG. 4. These functions will become more clear from a continued reading of the specification, particularly, with respect to the timing diagrams of FIGS. 6–15.

An END OPERATION signal state 10 is entered from the logical connected null state 11 to signify end of operation; that is, a particular input/output operation is being terminated.

Referring particularly now to FIGS. 6–15, inclusive, the various interconnection signal state changes are illustrated for achieving various interconnection sequences. In these figures, the abbreviation TO means tags out and consists of the signal states of three tag out lines 32. BO stands for bus out and corresponds to lines 34 signals. The illustrated signal associated with BO merely shows validity or invalidity of the bus out lines without regard to the bit pattern carried by the signals. The term TI refers to tags in supplied over the two lines 36. In a similar manner, BI stands for bus in lines 38. The various legends used in the figures will become apparent from the description.

Figure 6:
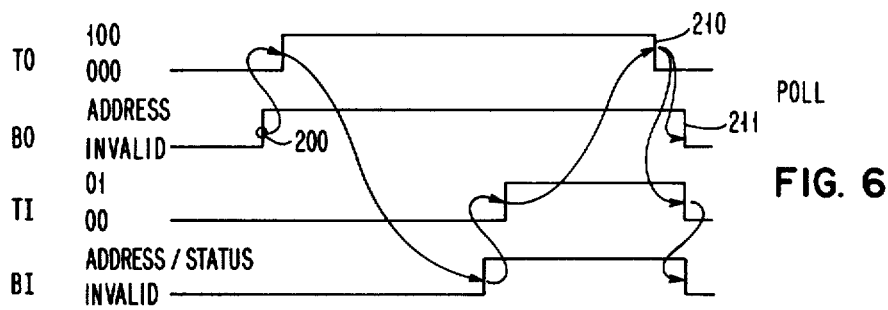

FIG. 6 shows the POLL sequence moving from the null disconnected state to the POLL state and back again. Initially, control unit 10 makes BO valid at 200. Then, the tag out is changed from 000 to 100 state (see FIG. 4). Attachment unit 12 responds to the change to the 100 state to supply signals on BI. As soon as BI is active, then the tag in state is changed from 00 to 01; i.e., verify. Following verify, the control unit 10 will receive the status signals over BI 38. Then at 210, after completing its portion of the POLL sequence, TO reverts to the 000 state which results in BO becoming invalid at 211. Attachment unit 12 responds by returning the TI state to 00 and dropping the address signal from BI. The POLL response for each device may be on but one line in bus in 38, such line indicating the responding device and the signal on the line being the device response. The POLL sequence may be initiated by control unit 10 in response to an interrupt signal or because of other signals in the subsystem.

Figure 7:
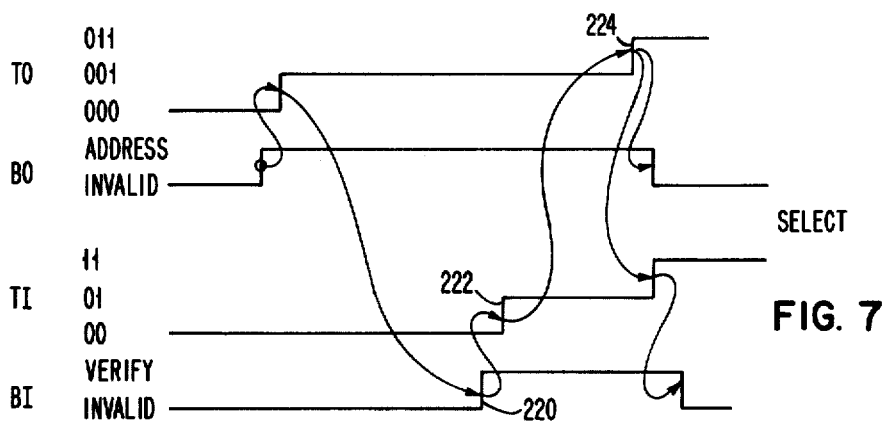

In FIG. 7, the timing for control unit 10 selecting the attachment unit 12 and an associated device 14 is shown. This sequence shows going from the disconnected null to a logical connected null state. BO is activated by a set of address signals for the device 14; then TO is changed from 000 to 001 state; i.e., the select state. Then at 220, the attachment unit 12 responds by activating BI with address verification and a limited initial status in (BUSY) and then verifies the validity of BI by changing the tag in state from 00 to 01 at 222. Control unit 10 receives the BI and TI signals and determines whether or not the selection should continue. If the selection is to continue, then control unit 10 at 224 changes its TO state from 001 to 011, the logical connected null state. The address on BO is then deactivated. Attachment unit 12 responds to the 011 state with a 11 tag in state showing a logically connected null has been established between control unit 10 and attachment unit 12 for selecting a device 14 at the same time attachment unit 12 erases the signals from BI.

Figure 8:
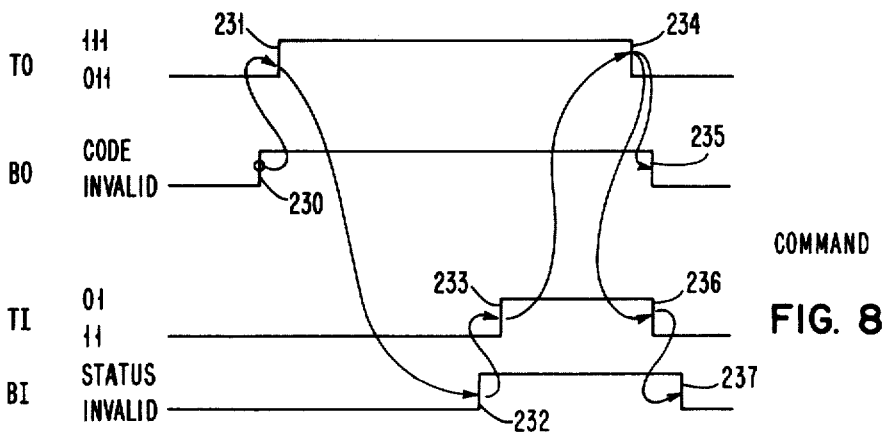

Normally after a poll, which determines the status of the device followed by a select sequence, a command for the selected device is transmitted from control unit 10 to device 14 via attachment unit 12. FIG. 8 shows such a sequence. All of the command sequences proceed from the logical connected null state. The command sequence is started at 230 by control unit 10 supplying signals to BO. A command code, for a device 14 that was selected in accordance with FIG. 7, is supplied over BO. When control unit 10 knows BO is valid, it changes its tag out state from 011 to 111 at 231. Attachment unit 12 responds at 232 to the 111 tag out state to supply initial status in over BI. As soon as BI is valid, then the tag-in state is changed from logical null 11 to 01, SERVICE IN. From SERVICE IN at 233, control unit 10 responds by returning to the selected null state at 234 and dropping the signals from BO at 235. Attachment unit 12, seeing tags out and bus out changing, responds by changing the tag in from 01 to 11 at 236 and erases the signals from BI at 237. The command for device 14 now resides in attachment unit 12.

Figure 9:
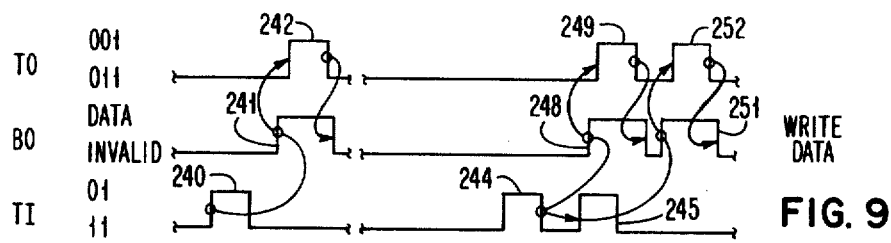
Figure 10:
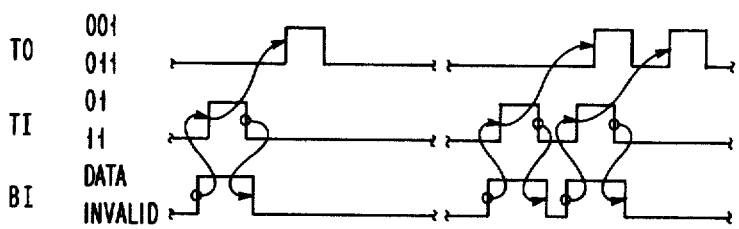

FIGS. 9 and 10 show data transfers. FIG. 9 shows writing data wherein data signals are transferred from a host via control unit 10 and attachment unit 12 for recording or printing on a device 14. Read data concerns the transfer of data from a device 14, such as a magnetic tape unit or DASD (direct access storage device), through attachment unit 12 and control unit 10 to a host (not shown). Both of these sequences proceed from the logical connected null state and use only one of the busses. The write data uses bus out 34 while the read data only uses bus in 38. The timing sequences are substantially identical to the service in/service out sequencing of the above referred to IBM 360/370 computer I/O subsystem wherein SERVICE OUT and SERVICE IN are interchanged for each byte of data transferred over a bus. For example, in FIG. 9, a tag in at 240 signifies to control unit 10 that attachment unit 12 can receive a data byte. Control unit 10 responds at 242 to the tag in state 01 to supply the next data byte over BO at 241 followed by the validating change in TO states from 011 (selected null) to 001, SERVICE OUT. After a predetermined time, both the tag out and the bus out states are returned to the quiescent logical connected null state. A plurality of exchanges may occur with each tag out and bus out transmission followed by a tag in transmission of SERVICE IN. Also, SERVICE OUT 001 may precede the data transfer with SERVICE IN 01 acknowledging completion of the data byte transfer.

A plurality of bytes may be transferred over bus out 34 without alternating between SERVICE IN and SERVICE OUT. In such an arrangement, a plurality of tag in 01 SERVICE IN signals may be sent by attachment unit 12 to signify to control unit 10 that a plurality of a succession of bytes may be transmitted rapidly for use by a device 14. For example, a pair of tag in signals 244 and 245 may be sent by attachment unit 12 in rapid succession. The first SERVICE IN signal 244 results in a first byte 248 being transmitted over bus out 34 with its associated tag out 001 signal at 249. Attachment unit 12 knowing it has sent out two tag in signals will count the number of tag out signals received to balance same against tag in signals. After receiving tag out signal 249, attachment unit 12 knows that an additional byte has to be transmitted over bus out 34 by control unit 10 in response to tag in signal 245. Accordingly, control unit 10 rapidly sends a second byte 251 with corresponding tag out signal 252 to attachment unit 12. After completing the rapid succession of byte transfers, 248 and 251, attachment unit 12 knows that both tag in signals 244 and 245 have been satisfied. Accordingly, the data rate over a bus out and bus in can be enhanced by using this overlap technique.

FIG. 10 generally has the same sequence of operation as described for FIG. 9; the operation illustrated by the timing diagram of FIG. 10 can be understood by comparing it with the description for the FIG. 9 timing diagram. It is to be understood, however, that bus in 38 carries the signals from attachment unit 12 to control unit 10, rather than in the reverse direction over bus out 34.

Figure 11:
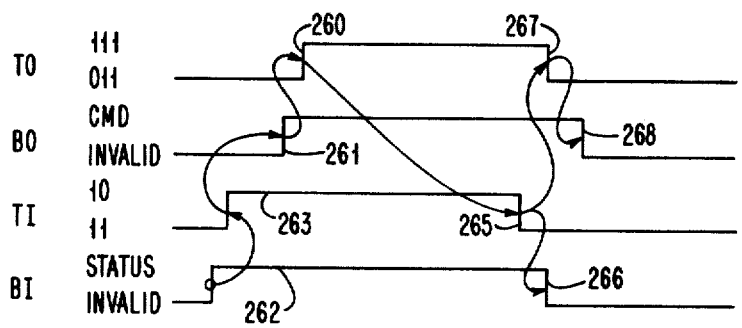

Either a write data or a read data operation can be ended by the END OP of FIG. 11 or by the previously described command sequence of FIG. 8. End Operation by unit 12 is achieved by attachment unit 12 knowing either that the write or read operation has transferred the appropriate number of data bytes or early termination is required for some reason; i.e., an error was detected. This action is achieved by the host telling the control unit 10, which in turn tells attachment unit 12 the number of bytes to be transferred. Having matched the count of the desired number of bytes with the actual number of bytes, attachment unit 12 puts status information on bus in and sends a tag in 10 indicating end of operation. The tag in state changes from the selected null state 11 to the end of operation state 10. Control unit 10 senses the tag 10 and responds at 260 with a command over bus out 34 and its corresponding tag out 111.

Several things can occur. One, the command on bus out 34 supplied at 261 may instruct the control unit 10 and attachment unit 12 to stop the operation, may be a reconnect command for continuing or repeating the operation, and the like. Further, the response of control unit 10 at 260, 261 may be dependent upon the status provided over bus in 38 at 262 together with the end operation tag at 263. For example, the status on bus in at 262 is so-called ending status. Before responding with the command gate state 111, control unit 10 evaluates the ending status for determining what command to send at 261 over bus out 34. In any event, the tag sequence of FIG. 11 provides for an ending operation of a data transfer operation of FIGS. 9 and 10. The end operation sequence is completed by attachment unit 12 responding to the tag out 111 at 265 by dropping the end operation tag 10 and the bus in status signals at 266. Control unit 10 senses the return of the tag in state from 10 to 11 and then changes its tag out state from 111 to selected null 011 at 267 and simultaneously erases bus out at 268. Accordingly, at the end of the data transfer operation, control unit 10 and attachment unit 12 are in a selected null interconnected state.

Figure 12:
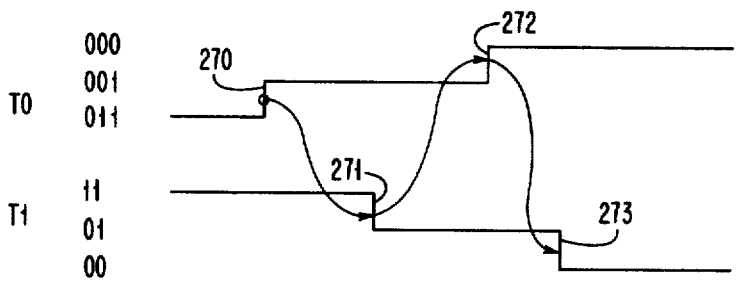

It may be desired by control unit 10 to deselect or free attachment unit 12. Accordingly, the deselect procedure of FIG. 12 is initiated at 270 by control unit 10 changing its tag out state from selected null 011 to the intermediate service out state 001. Attachment unit 12 responds at 271 by sending in tag signal 01, the SERVICE IN signal. Deselection is initiated at that point by control unit 10 changing the SERVICE OUT state 001 at 272 to the logical or disconnected null state 000. Attachment unit 12 senses the change to the disconnected null state 000 and responds at 273 by changing its tag in state from SERVICE IN 01 to the logical disconnected null 00 state.

In accordance with the description and timing of FIGS. 6-12, a complete poll, select, data transfer operation, end of operation and deselection is shown using but three tag out lines and two tag in lines. These operations are so-called normal operations which occur when all equipment and programming is operating in accordance with its design objectives. Detection of the various tag states and the change of tag states is described later in the specification.

Under unusual circumstances, attachment unit 12 or a portion of control unit 10, may have circuit error conditions that prevent the described normal communications. Under such circumstances, it is desired to automatically and reliably obtain status information about the devices 14 and attachment unit 12 for transmission to the control unit 10 or host (not shown) for analysis as is well known in the data processing arts. By way of example, U.S. Pat. 4,100,605 shows error status reporting using shift registers and the serial transmission path independent of the normal communication paths between a plurality of such units. The shift register concept set forth in U.S. Pat. No. 4,100,605 may be employed in implementing the to-be-described status recovery operation. The error conditions to be analyzed include connection errors, i.e., bus out and tag out errors as well as bus in and tag in errors. To achieve maximum status acquisition upon detection or identification of an error condition, a request connection check (RCC) set of sequences shown in FIGS. 13 and 14 provide a maximal recovery type communication for scanning out error latches. The error latches are interconnected as a shift register within attachment unit 12. When normal bus out and bus in communications are not possible, the two sequences RCC1 and RCC2 employ complementary tags for maximizing the probability of acquiring the status information; that is, the probability of a single tag line being in error may be high; however, the probability of two tag lines being in error is very low. Accordingly, by using complementary tag lines, there is a high probability of obtaining error status information. Invocation of RCC1 or RCC2 by control unit 10 can be caused by a lack of response from attachment unit 12 to a tag out sequence or an erroneous response. Insofar as attachment unit 12 is concerned, both the RCC1 and RCC2 transmission techniques are identical. The RCC1 and RCC2 initiation is altered for maximizing the probability of obtaining the error status. Such RCC sequences may be initiated by diagostic programs (not shown nor described), in conjunction with such diagnostics or for preceding an error recovery procedure beyond the scope of the present description. Diagnostic commands may be periodically employed to invoke RCC1 or RCC2 for ensuring the capability of the auxiliary circuits in attachment unit 12 for implementing these functions.

In a usual recovery procedure, RCC1 is first employed because it is the simplest sequence. Referring to FIG. 13, control unit 10 changes its tag out state from 000 disconnected null to the RCC1 state 010. Attachment unit 12 responds to the 010 state to actuate later described circuitry for supplying status signals to the control unit 10. Because some of the connections of bus out may be in error, control unit 10 supplies timing signals over all lines of bus out 34. Accordingly, the same signal is transmitted over all nine lines and provides a high probability of providing timing signals to the attachment 12 status recovery circuits. The pulses are sent in a sequence termed A and B pulses. The circuits later described respond to the bus out timing pulses to provide signals serially over bus in 38; that is, all nine lines of bus in 38 receive the same signal, one status bit at a time. This arrangement corresponds to the serial shift register connection of U.S. Pat. No. 4,100,605. The serial transmission from several devices may use one line for each device. With eight bus in 38 lines, eight devices simultaneously supply status signals over respective ones of the bus in 38 lines.

Accordingly, the tag out 010 started at 280 informs attachment unit 12 that timing pulses are to be received over bus out 34. When the first pulse 281 is received by attachment unit 12, it immediately supplies a signal bit to all lines of bus in 38, as at 282. Each subsequent A pulse as at 283 and 284 supply status in signals, one bit at a time to control unit 10. The bit pattern is indicated by the shaded areas 285. Intermediate the bit patterns, the bus in lines 38 are all kept to the active state for informing control unit 10 that attachment unit 12 is still operative. Since control unit 10 knows the number of error latches to be scanned and hence the number of bits to be transmitted over bus in 38, it sends a number of timing pulses equal to twice the number of status bits. The intervening B pulses 288 shift the signal contents of the attachment unit 12 status circuits for the transmission of the next bit at the next succeeding A pulse 283.

Referring next to FIG. 14, the RCC-2 sequence is described. Since the RCC-2 tag out state 101 is more than a Gray code change from the disconnected null state 000, an intermediate state 100 (poll) is momentarily entered as a Gray code transition step to state 101. The POLL state 100 followed by a 101 or 110 tag state is never a poll operation. The duration of the 100 state leaves an ambiguity in the attachment unit 12. Therefore, control circuits 16 delay response for one tag clock period (a predetermined time) to ascertain whether a 110 or 101 state follows. Transition to the 110 or 101 states from 100 may be direct, as any change in tag states or may be separately timed as hereinafter described.

In a timed change of states, the duration of 100 state is insufficient for attachment unit 12 to respond to the 100 state as a poll command. The RCC2 sequence is started by control unit 10 changing its tag out state at 290 from 000 to 100. The duration of the 100 tag out state terminates at 291 whereupon the disconnected null state 000 is again sent out by control unit 10. The duration of the 000 state at 292 is extremely short; After 292, 101 tag out state is immediately set at 293. The 101 state is detected by the special circuits of attachment unit 12 in the same manner that the 010, RCC1 state was detected. Again, bus in 38 is used as a serial transmitter having nine parallel lines carrying the same bits, one bit at a time. In a similar manner, the bus out 34 is also used for clocking between A and B pulses 294, 295 as described for FIG. 13. Bus in 38 is kept active as at 296 for indicating to control unit 10 that the attachment unit 12 circuits are responding. When return to the 000 state is dispensed with, receipt of 110 or 101 in a tag clock period immediately following 100 becoming active indicates it is a transition poll state and not a true poll operation.

When the appropriate number of A, B pulses 294, 295 have been sent and the status information has been recovered, the 101 tag state is discontinued at 298. The tag state 000 is entered at 299 for a short period of time. The transition 100 poll state is momentarily used at 300 to signify the RCC-2 Gray code transition state. At 301, the disconnected null state 000 is again established.

The attachment unit 12 also can control the disconnection of the RCC2 status recovery state; that is, after the appropriate number of shift register signals have been sent over bus in 38, the shift register will have all zeroes. At this time, bus in 38 will have an invalid all zeros state, as at 302, signifying no more signals will be transmitted. The all zeros invalid state must last longer than the bit period 303 which is governed by the duration of the A and B pulses mentioned above. Accordingly, when the invalid state 302 is detected by control unit 10, the last A pulse 303 results in the change 298 from the RCC2 state to the 000 disconnected null state as above described.

Figure 15:
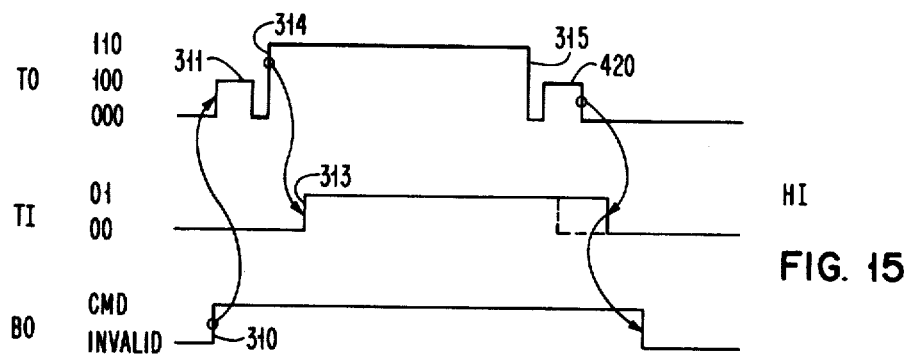

The hardware immediate (HI) circuits 80 of FIG. 2 are initiated and controlled by control unit 10 via the tag sequence of FIG. 15. The same sequence, as described with respect to FIG. 14, uses the poll state 100 as an intermediate or transition state between the disconnected null state 000 to the HI state 110. The tag out state 110 actuates circuit HI 80 to decode a command received over bus out 34 for actuating auxiliary control circuits in control circuits 16 for turning off a device connected to attachment unit 12, for example. Other control functions for preserving the safety and integrity of the devices 14 and attachment unit 12 may also be employed. The FIG. 15 sequence begins at 310 wherein the command for HI 80 is loaded on bus out 34. This action is followed by a momentary transition to the poll state 100 at 311. The 110 HI state is reached at 314 which causes attachment unit 12 to respond with an 01 SERVICE IN tag signal at 313. Hardware immediate circuits 80 in response to the tag 110 decodes the command and executes it. The tag out state 110 is maintained for a predetermined time until 315, when the ending sequence as described for the RCC2 sequence of FIG. 14, occurs.

FIGS. 13, 14 and 15 show error status recovery under degraded modes of operation, as well as a sequence for actuating special circuits that bypass the normal control circuits and the normal tag sequences of the interconnections between control unit 10 and attachment unit 12. This capability raises the confidence level and integrity of the subsystem in a recovery process. The circuit details for implementing the above described sequences are described next.

Generation of tags and recording of same can follow the usual encode decode techniques widely used in data processing. Shift register sequencing can be employed for generating the sequences shown for tags out and tags in, respectively, in FIGS. 6–15. Further, hardware decoding circuits and timing circuits may also be employed. Microcode may be employed for the tag generation using known microcoding techniques for sequencing machine operations. In accordance with all of the above, FIG. 16 shows a SERVICE OUT tag generation for transmission of a command over bus out 34. The command out state 111 is stored in a memory flip flop 320 which actuates AND gate 321 to pass a data time signal 322 for generating the SERVICE OUT tag state 001. The data time signal on line 322 signifies to AND circuit 321 that bus out 34 has received the command code for a predetermined time. Generation of data time signal follows known timing signal generation techniques. All of the tags may be generated in a similar manner.

FIG. 17 shows the RCC circuits for implementing both RCC1 and RCC2 sequences. Tag decode is not shown. Bus out 34 has all of its lines applied in parallel to an OR circuit 325 which combines the signals or bits on all lines into a single signal. Therefore, the A and B pulses shown in FIGS. 13 and 14 appear on line 326 even if but one of the bus out lines is operative. AND gate 327 responds to the RCC tag signals 010 or 101 supplied via OR circuit 328 to toggle RCC clock flip flop 329. The first A pulse 281, for example, toggles RCC clock flip flop 329 to a first state for actuating pulser 330 to supply a sampling pulse to AND gate 331. Lines 332 carry the signal state of the last flip flop of shift register 333 which is the first error latch for transmitting status information over bus in 38 to control unit 10. Actuation of AND gate 331 is completed by OR circuit 334 passing either of the RCC tag signals 010 or 101 for transmitting the bit of status information to bus in 38 in response to the A pulse on bus out 34. The next received pulse over bus out 34 is a B pulse. For example, pulse 288 triggers RCC clock flip flop 29 back to its original state. This transition is blocked from pulse generator 330 using known circuit techniques but does actuate pulser 336 to shift the signal contents of shift register 333 one digit position. Shift register 333 is constructed to be a so-called open-ended shift register such that as the signal contents are shifted to the right, as viewed in FIG. 17, at each shift the signal stored in the latch or flip flop supplying the line 332 signal is lost. At each shift, the latch at the other or left end of the shift register 333 receives a zero, all using known shift register techniques. In this manner, the signal contents of shift register 333 are shifted out once and then are lost by the shifting erasure. Alternatively, shift register 333 may be an end around shift register wherein the bit pattern is always maintained. If there is faulty shifting, then the significance of the data contents of shift register 333 is lost and certain recovery procedures would have to be employed to ensure that the received status information is correctly interpreted. It is to be understood that the output of AND gate 331 goes to all lines of bus in 38 using known fanout circuits.

FIGS. 14 and 15 show unique tag sequences for moving from the disconnected null state 000 to either the RCC2 state or the HI state via a momentary or transition poll state. FIG. 18 shows one circuit which may be employed to ensure proper interpretation of the tag-out state 100 when it is used for two different purposes. The FIG. 18 illustrated circuits of attachment unit 12 include poll flip flop 340 for indicating the transition poll state 100 to distinguish this state from the regular duration poll state 100. The decoded tag state 100 received over line 341 from a tag signal 70 sets poll flip-flop 340. Flip-flop 340 then supplies an active signal over line 342. An integrator 343 measures the duration of the 100 state stored in flip-flop 342. Integrator 343 may be an analog integrator or a digital counter which integrates time. If the flip flop 340 is on for a predetermined time, then integrator 343 supplies a poll signal over line 344 to another poll flip flop (not shown) for actuating the poll sequencing within attachment unit 12. The poll flip-flop 340 has a reset input controlled by integrator 345 which receives a not 100 signal. Integrator 345 has a short time constant and therefore supplies a pulse to reset poll flip flop 340 before integrator 343 will emit a poll signal over line 344. Delay circuit 346 delays the line 342 signal until after tags 101 or 010 have been received by attachment unit 12. This delay enables initiating the RCC or the HI sequences after the transition poll state 100 and the momentary 000 state have been changed to either the HI state 110 or RCC2 state 101. The delayed line 342 signal enables a pair of AND gates 347 and 348 for respectively setting the RCC2 flip flop 350 and the HI flip flop 351. AND gate 347 receives the 101 tag signal from decoder 70 (FIG. 3) for setting RCC2 flip flop 350. The output of RCC2 flip flop 350 is supplied to the FIG. 17 illustrated circuit as the 101 tag signal to OR circuits 328 and 334. In a similar manner, AND gate 348 receives a 110 HI tag state from decoder 70 (FIG. 3) for setting HI flip flop 351. HI flip flop 351 when set enables nine AND gates 352 (shown as a single symbol) to pass the bus out 34 signals to HI decoder and sequencer 353, the detailed operation of which is not important to understand in the present invention; albeit it is understood that circuit 353 is used primarily for turning off a device 14 via a signal supplied over cable 354 for protecting it during an error condition in attachment unit 12 or control unit 10. The cable 354 goes to control circuits 16 (FIG. 2) for transmitting the control signal over one of the lines 68 to device 14. Such transmission uses circuits not used in the usual subsystem day-to-day operations. Elements 352, 353 and 351 are in the HI circuits 80 of FIG. 2. In a similar manner, the FIG. 17 circuits along with RCC2 flip-flop 350 and flip-flop 340 and the associated integrators are in RCC circuits 81.

Returning to FIG. 18, flip-flops 350 and 351 are reset by the disconnected null tag out state 000 via integrators 360, 361. Integrators 360, 361 prevent resetting RCC2 flip flop 350 and HI flip flop 351 by the momentary 000 tag state occurring at 299 of FIG. 14 and the momentary 000 tag state following transition 315 in FIG. 15. The SERVICE IN tag 01 and tag 00 occurring during hardware immediate sequencing shown in FIG. 15 is provided by the tag in circuit 363. Circuit 363 responds to the 110 tag signals received over line 364 and the output of AND gate 365 which passes delayed flip flop 340 signals whenever the 000 tag signal occurs; that is, this FIG. 18 circuit arrangement detects the 000 tag state at 292 and 299 of FIG. 14. Tag in circuit 363 can be a hardware sequence, microcode sequence, and the like, using known circuit design and programming techniques and as exemplified by the other figures of the present application.

FIG. 19 shows an alternate reset circuit for poll flip flop 340. OR circuit 368 passes either the tag signals 101 or 010 for resetting the poll flip-flop 340 over a line 369. An integrator 370 responds to the 000 tag state occurring for a predetermined time for also supplying a reset signal. In this arrangement, integrator 34 of FIG. 18 has an integration time constant greater than the pulse periods defining changes in tag states.

FIG. 20 illustrates circuits of control unit 10 for generating the RCC and HI tag out sequences of FIGS. 14 and 15. It is to be understood that the circuit diagrams, as are all other circuit diagrams in this application, are a logic representation and can be implemented in microcode, programmable logic arrays, and other forms of logic performing devices. The tag sequences shown in FIGS. 14 and 15 are respectively determined by a pair of flip-flops 375 and 376 set by signals received over sequence selecting lines 377 and 378. A microprocessor (not shown) of control unit 10 which performs an analysis of the connection between control unit 10 and attachment unit 12 generates the select signals on lines 377, 378 in accordance with procedures beyond the scope of the present description. Since the timing of the tag sequences for the tag out lines is the same, OR circuit 380 combines the output of flip flops 375, 376 for generating a common tag sequence using the transition poll state 100. Additionally, RCC2 flip flop 375 supplies its active signal over line 381 to an AND circuit 382 for setting the tag out 101 flip flop 383. Flip-flop 383 actuates a tag coder of usual design to send the unique tag 101 for indicating RCC2. In a similar manner, HI flip-flop 376 supplies its activating signal over line 384 to an AND circuit 385 for setting the 110 tag out flip flop 386 for emitting the 110 tag out activating signal at the appropriate time. It should be noted that the 101 and 110 tag out signals respectively on lines 387 and 388 are encoded for transmission over the three tag out lines 32. Such encoder is incorporated in control unit 10 and not specifically disclosed.

The generation of the momentary or transition 100 state and a delay for generating a 101 and 110 tag state employs the use of AND/OR circuit 390 which actuates a multistable multivibrator 391 to determine the duration of the transition 100 state. The output signal of monostable multivibrator 391 over line 392 is the transition 100 activating signal which goes to an encoder of control unit 10 for generating the binary 100 state on tag lines 32. The first actuation of monostable multivibrator 391 for generating the 100 state at 290 and 311 respectively of FIGS. 14 and 15 is via AND gate 393 of AND/OR circuit 390. The tag signal 000 (control unit 10 includes circuits, not shown, of the tag encoder that supply each "decoded" tag signals for control) is inputted to AND circuit 393 via line 394 while the output signal from OR circuit 380 supplied over line 395 is also received by AND circuit 393. The timing of the 100 transition state is set by a tag clock signal received over line 396 and generated using known computer timing circuits and techniques. The output signal from AND 393 passes through the OR portion 397 of AND/OR circuit 390 for actuating monostable multivibrator 391 to generate signal 290 or 311 (FIGS. 14, 15). The monostable multivibrator 391 output signal also travels over line 400 for actuating AND circuit 401 of AND/OR circuit 402. The operation is such that as monostable multivibrator 391 turns off; i.e., generates the transition at 291 for example, AND circuit 401 supplies a pulse through delay circuit 403 for generating the RCC tag 101 or the HI tag 110. The other inputs to AND circuit 401 are the tag clock signal on line 396 and the RCC2 OR HI signal from OR circuit 380 received over line 395. Delay circuit 403 provides a signal delay corresponding to the duration of the 000 state at 292 of FIG. 14. At this point, it should be noted that when multistable multivibrator 391 turns off and removes a 100 signal to the control unit encoders (not shown) for the tag out signal, no actuating signals are being supplied; therefore, the control unit 10 encoder (not shown) automatically, supplies the 000 tag out state. However, when delay 403 finally emits its signal from AND circuit 401, the signal travels over line 404 to sample AND gates 382, 385. Only one of the AND gates 382, 385 will be enabled by the RCC2 flip flop 375 or the HI flip flop 376 for setting but one of the tag out flip flops 383 or 386.

When direct transition from 100 to 110 or 101 states is desired, delay 403 and monostable multivibrator 391 may be omitted. The logic flow is still similar.

The tag out flip flop 383, 386 supply continuous tag state signals 101 and 110, respectively, for a predetermined time. That predetermined time is determined in control unit 10 by counting the AB pulses supplied over bus out 34. AND circuit 406 responds to the tag clock signal on line 396 to supply repetitive pulses over line 407. The line 407 succession of pulses generate the AB pulses by connecting line 407 to all of the bus out lines via line 408 to AND circuit 409. AND circuit 409 is enabled by the 101 tag signal on line 387 to pass the line 408 pulses to bus out 34, indicated by the vertical line adjacent AND gate 409. The AB pulses are generated for RCC1 by OR circuit 415 passing the control unit 10 "decoded" tag signal 010.

The line 407 pulses also time the duration of the tag signals 010, 101 and 110. Counter 410 has a modulus equal to one less than the number of pulses to be supplied over bus out which is made equal to the duration of the tag 110 signal of FIG. 15 as well. Accordingly, counter 410 counts down in accordance with each AB pulse supplied for the RCC sequences. At time out time counter 410 emits a carry-out pulse over line 411 to reset flip flops 375, 376, 383 and 386. The line 411 carry out signal also travels to AND circuit 412 of AND/OR circuit 390 for actuating monostable multivibrator 391 to produce a second time-limited transition 100 tag state signal. It should be noted that monostable multivibrator 391 is not actuated upon the cessation of tag signal 101, but must have a slight delay. To this end, the carry out signal from counter 410 is supplied to AND circuit 413 of AND/OR circuit 402. AND circuit 413 passes the tag clock signal from line 396 in response to the signal from OR circuit 380 and the carry out signal on line 411 to initiate a signal delay through delay circuit 403. Again, all the tag signals having been reset, 000 is supplied over the tag out lines 32. As soon as delay circuit 403 emits the second pulse over line 404, the pulse actuates AND circuit 412 of AND-OR circuit 390 for passing the pulse to actuate monostable multivibrator 391 which then generates the trailing transition 100 state signal 300 of FIG. 14 or 420 of FIG. 15. OR circuit 421 combines the control unit 10 "decoded" tag out signals on line 387 and 388 for enabling AND circuit 406 to pass the tag signals on line 396 to counter 410; that is, if either RCC2 or the hardware immediate sequence is being indicated by the respective flip flops 383 and 386, counter 410 is actuated.

FIG. 21 illustrates a tag in generator for use with attachment unit 12. It is to be understood that a tag out generator (not shown) which responds to a tag in signal in a similar manner and combines conditions and commands of control unit 10 can be used to generate a tag out sequences, such as described for the RCC and HI sequences. The three binary encoded tags in received over tag in cable 32 are received by decode circuit 425. Such decode circuit 425 may be timed by a clock signal received over line 426 in the usual manner. The four tag in states are represented by the four latches 427, 428, 429 and 430, respectively, for the disconnected null state 00, SERVICE IN/verify state 01, the connected null state 11, and the end operation state 10.

The disconnected null state 00 indicated by latch 427 can only be entered from the SERVICE IN/verify state 01. Accordingly, AND circuit 431 responds to the 01 state signal received over line 432 from latch 428 and the "000" output signal of decode of 425 received over line 433 to set latch 427 to the 00 state. In an alternate arrangement, the valid tag in signal 01 can replace the line 432 signal for using the actual tag signal for setting latch 427. The output signal of AND circuit 431 also travels over line 434 for resetting latch 428 via OR circuit 425. The latch 427 signal supplies its 00 indication over line 436 to error detection circuit 438. Error detection circuit 438 is a sequence verifier for ensuring that latch 427 is not inadvertently set from state 11 or 10 or when decode 425 has emitted a signal indicating other than a disconnected null 000 signal on tag out cable 32.

Latch 428 may be set from either the 00 disconnected null state or the connected null state 11. AND-OR input circuit 439 has an A1 input portion responsive to the line 436 disconnected null signal from latch 427 and a decoded 001 signal received over line 440 from decode 425 to set latch 428. Latch 428 setting signal on line 442 also resets latch 427 and latch 429 via OR circuit 443. In setting latch 428 from the selected null state 11, the A2 input portion of AND-OR circuit 439 responds to the latch 429 "11" signal received over line 444 and the line 440 decoded tag 001 signal. Resetting latches 427 and 429 occur in the manner described above.

Latch 429 representing the selected null state 11 is set by AND/OR circuit 446. The A1 input portion sets latch 429 when there is a change from the 01 state to the 11 state. Accordingly, the A1 AND input portion of AND/OR circuit 446 supplies a latch 429 setting signal over line 447 whenever four conditions occur. The first of these conditions is that latch 427 is in the reset state as indicated by the signal on line 448. The second condition is that latch 428 is in the set state as indicated by the signal on line 432. The third condition is that latch 430 is in the reset state as indicated by the signal on line 450. The final condition is that decode 425 as decoded tag out signals representing the 011 state as indicated by an active signal on line 451. In a similar manner, the A2 AND input portion of AND-OR circuit 446 supplies a latch 429 setting signal whenever the latch 430 is in the set state as indicated by the signal on line 453 and the line 451 signal is active. The latch 429 signal on line 447 resets latches 428 and 430, as shown.

Latch 430 is set to the active condition by AND circuit 456 supplying a pulse signal over line 457. The line 457 signal also resets latch 429 via OR circuit 443. AND circuit 456 responds to the latch 429 "11" signal on line 444 and the decoded tag out signal 001 on line 440 plus an end of operation signal generated locally and received over line 458 to set the end operation latch 430. The line 458 signal may be generated in a manner similar to the operation of counter 410 in FIG. 20 only that the counter is in attachment unit 12 to count bytes transferred between a device 14 and a host to detect end of a data transfer. Also detected error conditions result in an end operation signal. Line 458 represents all these functions.

Error detection circuit 438 receives all the above described signals plus an additional line 460 signal from decode 425 for carrying other decoded tag out signals to detect errors in the Gray code sequencing.

A detected error indicated on line 461 in a timed relationship to a clock signal is received over line 426. Such detected error signal may result in EO line 458 being activated. A proper sequence detection is indicated by the signal on line 462 which carries a timed AND gate enabling signal to a plurality of AND gates 465, 466, 467 and 468. The four AND gates respectively receive the tag state indicating signals from latches 427, 428, 429 and 430 plus local control signals, such as the end of operation signal on line 458 to supply the valid tag in signals 00, 01, 11 and 10 to encoder 469. Encoder 469 supplies the encoded tag in signals over lines 56 to gates 86 (FIG. 2) for transmission in binary code to two-bit register 72. Register 72 in turn supplies the tag in signals over two tag in lines 36.

The operation of the tag out circuits (not shown) of control unit 10 can proceed as described for the FIG. 21 illustrated tag in circuits. In the tag out circuits (not shown), local control signals will have a greater effect since the tag in signals are in response to tag out signals. It should be noted that FIG. 3 shows a preferred manner of encoding the tag out signals.

When the end operation signal on line 45 actuates a tag in signal via AND circuits 468 and 456, status circuit 470 also responds to the signal on line 458 to supply status signals over lines 60 to bus in register 73 via gates 89. Line 458 is also connected to gate 89 that passes the status signals from circuit 470.

Command functions of the attachment circuit are initiated by the auxiliary tag signal being one, as described for FIG. 4. In this regard, line 341 from decode 425 carries the decoded tag 100 signal to FIG. 18 circuit 471. When a true poll tag signal is detected by the FIG. 18 circuits, the poll signal on line 344 actuates poll decode circuit 472. Circuit 472 receives the signals transmitted over bus in 34 for decoding the poll commands. The poll commands will include address signals and command signals in accordance with known input/output systems architecture. For example, the poll may be addressed to the attachment unit 12 for determining whether or not a given device 14 is busy. In that case, as well as other instances, the poll decode 472 supplies sequencing signals over lines 475 to sequencing circuit 476. Circuit 476 can be constructed using known sequencing circuit techniques for achieving functions desired, such as transmission of status signals as indicated by the connection of line 477 to status circuit 470.

The command gate state 111 is decoded by decode 425 and indicated by decoded tag signal supplied over line 480. The line 480 111 signal actuates the decode circuit 481 to receive and decode the signals received on bus in 34. Decode circuit 481 can be any decoder, such as used in digital computers for years. Decoded command signals are supplied over lines 482 to sequencing circuit 483. Circuits 483 are the same type of sequencing circuits that sequence digital computers. The sequencing circuits 483 meld clock signals received over lines 484 to generate sub-operations or microcommands supplied over lines 485, all using known techniques.

While the invention has been particularly shown and described with reference to preferred embodiments thereof, it will be understood by those skilled in the art that various changes in form and details may be made therein without departing from the spirit and scope of the invention.

What is claimed is:

1. In an attachment circuit in a first controlled unit for attaching said first controlled unit to a second controlling unit, the attachment circuit having first and second input tag out lines, first and second output tag in lines and data bus means, said lines and bus means adapted to be connected to said controlling unit, each said line for carrying a binary signal, the improvement comprising:

a decoder connected to said first and second input tag out lines for decoding binary signals received thereover from said second controlling unit and having output means supplying a plurality of decoded tag out signals representative of the binary bit combination on the input tag out lines;

control circuit means having first means responsive to a first one of said decoded tag out signals for generating a signal electrically indicating a logical disconnected null state existing between said units for indicating no activity is occurring between said first and second units via said tag and bus lines;

second means in said control circuit means and being responsive to a second of said decoded tag out signals for generating a signal electrically indicating an active null connection between said units and simultaneously generating a signal electrically indicating no valid signals on said data bus means;

tag circuit means in said decoder connected to said first and second input tag out lines for receiving said decoded tag out signals within said decoder and being responsive to receipt of two binary signals on said first and second input tag out lines that are the complement of said binary signals indicating said first decoded tag out signal to supply said second decoded tag out signal;

third means in said control circuit means being responsive to a third one of said decoded tag out signals for indicating valid signals on said data bus means; and signal circuit means in said attachment circuit connected to said data bus means and to said third means in said control circuit means for exchanging signals with said data bus means at least when said third decoded tag out signal indicates valid signals on said data bus means.

2. The attachment circuit set forth in claim 1 further including a third input tag out line connected to said decoder; and additional control means connected to said decoder and being responsive to a fourth decoded tag out signal indicating a change in signal state of a binary signal received over said third tag out line with no changes in signal state of said first and second input tag out lines to perform a predetermined control function in accordance with the unchanged prior signal state of the binary signal on said first and second input tag out lines.

3. The attachment circuit set forth in claim 2 wherein said additional control means is responsive to said fourth decoded tag out signal when said first and second input tag out line signal indicates said logical disconnected null to supply status indicating signals to said signal circuit means for transmission over said data bus means and further including actuating means for actuating said signal circuit means to transmit such signals even though said third decoded tag out signal is inactive.

4. The attachment circuit set forth in claim 2 wherein said additional control means is responsive to said fourth decoded tag out signal when said first and second input tag out line signals indicate said logically connected null for actuating said signal circuit means to receive signals from said data bus means; and command decoding means connected to said signal circuit means and responsive to said additional control means to receive signals from said signal circuit means for decoding same and indicating a command received from said controlling unit.

5. The attachment circuit set forth in claims 1 or 2 wherein said first and second output tag in lines receive signals from the attachment circuit for generating electrical signals respectively electrically indicating tag in signal states of said first controlled unit and for transmission to said second controlling unit in response to received signals over said input tag out lines, including in combination:

tag in signal encoding means connected to said output tag in lines and connected to said decoder for receiving said decoded tag out signals, sequencing and gating means in said signal encoding means for converting said decoded tag out signals to output tag in signals for transmission over said output tag in lines to said second controlling unit and operative to send a response null signal corresponding to the received binary signals over said first and second input tag out lines for indicating said disconnected and connected null states respectively and further operative in response to said third decoded tag out signal to send an intermediate one of said output tag in signals over said output tag in lines for indicating a transition state between said disconnected and connected null states.

6. The attachment circuit set forth in claim 5 further including end operation means in said encoding means for supplying a set of output tag in signals over said output tag in lines indicating an end of operation.

7. The attachment circuit set forth in claim 6 further including status means responsive to said end of operation signal for supplying status signals to said signal circuit means for transmission over said data bus means upon each said indication of end of said operation.

8. The attachment circuit set forth in claim 5 wherein said disconnected null state corresponding to said first decoded tag out signals is represented by binary signals on said input tag out lines having an inactive signal state and said logically connected null signal being the complement of said inactive signal state of an active signal on all of said input tag out lines.

9. The attachment circuit set forth in claim 2 further including auxiliary circuit means in said attachment circuit connected to said decoder and responsive to predetermined ones of said decoded tag out signals other than said first through fourth decoded tag out signals for performing error recovery functions in said attachment circuit.

10. The attachment circuit set forth in claim 9 wherein said auxiliary circuit means includes timing means connected to said data bus means for receiving timing signals over a plurality of circuit lines in said data bus means and simultaneously supplying status signals over other ones of said lines in said data bus means for supplying status signals to said controlling unit irrespective of the degraded circuit operation of said attachment circuit.

11. The attachment circuit set forth in claim 9 wherein said controlled unit includes a plurality of electromechanical devices to be operated under control of said controlling unit and said auxiliary circuit means includes signal lines connected to said electromechanical devices and control means in said auxiliary circuit means for deactivating all of said electromechanical devices upon being actuated by said predetermined decoded tag out signals.

12. The attachment circuit set forth in claim 9 wherein said auxiliary circuit means includes timing means and further decoding means responsive to a decoded tag out signal derived from said third tag out line signal existing for a predetermined time less than the time for indicating a static tag signal on said input tag line for indicating transition from said disconnected null state to a predetermined one of said predetermined decoded tag signal whereby additional auxiliary operations can be effected directly from said disconnected null state while employing Gray code sequencing of said tag out signals.

13. The attachment circuit set forth in claim 5 wherein said logical disconnected null state is indicated by binary zero signals on said first and second input tag lines and by binary zero signals on said first and second output tag lines, said logical connected null being indicated by the complement of said binary zero signals on said first and second input tag out lines respectively, transitions from said logical disconnected null to logically connected null state being via a intermediate state wherein one of said first and second input tag out lines carries a binary one signal and one of said first and second output tag in lines carries a binary one signal;

said signal circuit means operative to transmit data signals upon transitions between said logical connected null state and said intermediate state; and said decoder capable of detecting a plurality of other predetermined ones of said decoded tag out states whereby operations in addition to said data transfers occur between said controlling unit and said controlled unit.

14. The attachment circuit set forth in claim 13 wherein said encoder means includes the capability of sending a signal over said two output tag in lines which is a complement of said intermediate state signal which signifies end of operation between said controlling unit and said controlled unit.

15. The attachment circuit set forth in claim 14 further including status means in said attachment circuit and responsive to said end of operation signal for sending status signals over said data bus means to said controlling unit.

16. The attachment circuit set forth in claim 15 further including auxiliary circuit means responsive to said predetermined other decoded tag out signal for sending status signals to said controlling unit over said data bus means independent of said end of operation signal.

17. The attachment circuit set forth in claim 16 further including timing means in said auxiliary circuit means responsive to signals received over said data bus means for timing the transmission of status signals supplied over said data bus means when said status signals are associated with said other predetermined decoded tag out signals.

18. In attachment circuit means for connecting a controlled unit to a controlling unit, the improvement comprising:

a first set of tag lines for carrying binary encoded signals from said controlling unit to said controlled unit;

a second set of tag lines for carrying binary encoded signals from said controlled unit to said controlling unit;

other electrical signal means operatively interconnecting said units;

decoding means connected to said first set of tag lines for receiving said binary encoded signals from said controlling unit and for supplying a first decoded signal in response to a first set of said binary encoded signals on said first set of tag lines, supplying a second decoded signal in response to a second set of said binary encoded signals received over said first set of tag lines, said second set of binary encoded signals being a binary complement of said first set of binary encoded signals and supplying a third decoded signal in response to a third set of binary encoded signals received over said first set of tag lines, said third set of binary encoded signals differing from each said first and second sets of said binary encoded signals but by a single signal change;

control means having first means responsive to said first decoded signal to generate an electrical signal for electrically indicating a logical disconnection between said units, second means responsive to said second decoded signal to generate an electrical signal for electrically indicating a logical connection between said units without any interactive operations, and third means responsive to said third decoded signal to generate an electrical signal for electrically indicating an interactive operation between said units via said other electrical signal means said first, second and third means being electrically interconnected when said third decoded signal immediately follows said second decoded signal and being further responsive to said third decoded signal immediately following said first decoded signal to generate an electrical signal for electrically indicating a change from said logical disconnection to said logical connection of said units; and checking means connected to said control means and responsive to said generated electrical signals which electrically indicate detection of predetermined sequences of said generated electrical signals which electrically indicate predetermined functions with respect to said units.

19. The attachment circuit means set forth in claim 18 further including fourth means in said decoding means to supply a fourth decoded signal in response to a fourth set of said binary encoded signals received over said first set of tag lines which fourth set differing from said second set of binary encoded signals but by a single signal change and differing from said first and third sets of binary encoded signals by more than one signal change; and first additional means in said control means responsive to said fourth decoded signal to generate an electrical signal for electrically indicating a command signal as being received over said other electrical signal means.

20. The attachment circuit means set forth in claim 19 further including encoding means for supplying signals over said second set of tag lines, status means in said control means for generating an electrical signal for electrically indicating operational status of said controlled unit and means in said encoding means connected to and responsive to said control means and said status means and said decoding means to supply a fifth set of binary encoded signals over said second set of output tag lines for generating an electrical signal for electrically indicating a logical disconnected null, said fifth set of signals being identical to predetermined ones of said first set of binary encoded signals, sixth means connected to and responsive to said control means, said status means and said decoding means for sending a sixth set of binary encoded signals over said second set of tag lines for electrically indicating a logical connected null, said sixth set of binary encoded signals being identical to second predetermined ones of said second set of binary encoded signals, and further means for supplying additional binary encoded signals to said second tag lines for electrically indicating status of operation of said controlled unit and having means actuating said status means for sending status signals over said other electrical signal means to said controlling unit during a one of said additional binary encoded signals on said second set of tag lines.

21. An attachment circuit in a controlled unit for attaching it to a controlling unit via tag lines and data lines,
the improvement including in combination:
first means in said attachment circuit for generating an electrical signal electrically indicating an end-of-operation to be signalled to said controlling unit by said generated signal being supplied to said controlling unit over said tag lines;

second means connected to said tag lines and being responsive to said first means generated electrical signal for said electrical indication for encoding a set of multibit tag signals for transmission over said tag lines to said controlling unit;

third means having memory means retaining status signals in said controlled unit;

fourth means connected to said third means to said data lines for transmitting status to said controlling unit and being connected to said second means for being responsive to said encoded set of tag signals for transmitting said status signal whenever an end-of-operation is indicated to said controlling unit by said controlled unit;

fifth means for receiving tag signals from said controlling unit over predetermined ones of said tag lines, sixth means connected to said first means, said fifth means and to said data lines and responsive to said fifth means receiving predetermined ones of said controlling unit supplied tag signals to receive signals from said data lines for actuating said first means for indicating an end of operation; and including means connected to said tag lines for receiving tag signals and having timing means for measuring duration of said received tag signals to determine whether or not a predetermined duration occurs and further having means responsive to said timing means for electrically indicating a received tag signal having a duration less than said predetermined duration for actuating said fourth means for transmitting status to said controlling unit.

22. In attachment circuit for a controlled unit for attaching said controlled unit to a controlling unit, a plurality of tag and bus lines interconnecting said units, said attachment unit including in combination;

a tag out register having a predetermined number of bit positions respectively connected to predetermined ones of said tag lines for receiving tag out signals;

a bus out register having a plurality of bit positions respectively connected to ones of said bus lines for receiving electrical signals from said bus lines, a tag in register having a predetermined number of bit positions connected to predetermined ones of said tag lines for supplying tag in signals thereover to said controlling unit;

a bus in register having a predetermined number of bit positions respectively connected to predetermined ones of said bus lines for supplying bus in signals thereto for said controlling unit;

a tag decode circuit connected to said tag out register for decoding received tag out signals and supplying decoded tag signals;

tag in means connected to said tag in register for supplying tag in signals thereto and to said tag decode circuit for supplying said tag in signals in response to said decoded tag signals;

auxiliary circuit means connected to said tag out register and to said bus in register and to said bus out register and having decode means connected to said bus in register, said tag out register and said bus out register and responsive to predetermined ones of said tag out signals in said tag out register for performing functions in said attachment circuit independent of said tag in means including receiving predetermined signals from said bus out register for supplying predetermined status indicating response signals to said bus in register.

23. The attachment circuit set forth in claim 22 further including shift register means for storing status indicating signals of said controlled unit, timing means for operating said shift register;

said auxiliary circuit means being responsive to said predetermined signals received over said bus out register when said predetermined tag out signals are active for actuating said timing means in accordance with said received predetermined signals in said bus out register; and means connecting a single bit signal shifted from said shift register by said timing means to supply such single bit signal to all digit positions of said bus in register.

24. The attachment circuit set forth in claim 23 wherein said timing means is connected to all digit positions of said bus out register and said timing means being responsive to any one of said digit positions for actuating said timing means.

25. The attachment circuit set forth in claim 24 further including means in said auxiliary circuit means for measuring the duration of signals received from said tag out register and control means interposed between said measuring means and said timing means for actuating said timing means only when a predetermined set of signals from said tag out register lasts less than a first predetermined time and more than a second predetermined time followed by a second predetermined set of signals from said tag out register.

26. The attachment circuit set forth in claim 25 further including means responsive to said first set of tag signals from said tag out register lasting more than said first predetermined time for supplying status signals in parallel to said bus in registers such that each bit position of said bus in register contains a bit pattern representative of the status of said controlled unit.

27. The attachment circuit set forth in claim 26 further including hardware immediate means in said auxiliary circuit means and being responsive to a third predetermined set of signals in said tag out register following said first predetermined set of tag signals in said tag out register lasting less than said predetermined duration for disabling operation of a portion of said controlled unit.

28. The attachment circuit set forth in claim 23 wherein said shift register means is connected to said bus in register in a manner to supply said status signals to said bus in register independent of the tag in signal state of said tag in register.

29. In a unit for transmitting signals over a set of data lines to another unit, a plurality of control signal lines extending from said another unit to said transmitting unit for supplying control signals thereto, the improvement, including in combination:
decoding means connected to said control lines for electrically indicating first and second types of control signals received over said control signal lines;

a register connected to said control signal lines for supplying signals thereto, and having a plurality of bit positions; one bit position for supplying a single signal to one of said control signal lines;

signal supply means for supplying signals to said register;

control means responsive to said decoding means electrical indication of said second type of control signal for actuating said signal supplying means to supply a bit-indicating signal in a succession of signals to all bit positions of said register whereby said bit is supplied over all signal lines at a time to said another unit and responsive to said first set of decoded control signals for actuating said signal supplying means to supply a plurality of data bit signal patterns to said register whereby data bits supplied over said signal lines exhibit said patterns;

additional lines extending from said another unit to said transmission unit;

said signal supplying means being connected to said additional lines for receiving timing signals from said another unit independent of said control means for transmitting said bit indicating signals to all bit positions of said register; and timing means in said control means and responsive to said second type of control signal for actuating said signal supplying means for supplying said bit-indicating signals to said register independent of the signals then on said data and control signal lines.

30. The method of establishing interactive control between a pair of units,
including the steps of:
supplying a first set of binary signals from the first unit to a second unit for indicating a logically disconnected state;

in response to receiving said first set of binary signals from said first unit, supplying a set of signals identical to said first set of signals from said second unit to said first unit to verify said logically disconnected state;

supplying a second set of binary signals from said first unit to said second unit to indicate a logically connected but operationally inactive state in response to said second unit receiving said second set of binary signals from said first unit, supplying a set of signals identical to said second set of signals from said second unit to said first unit for verifying said logically connected state; said first and said second set of binary signals being the binary complements of each other;

while changing between said logically connected and logically disconnected states respectively supplying additional sets of signals to said first and second units from said second and first units, respectively, for indicating a transition between said states; and for implementing data-transfer interactions between said units, supplying a sequence of supplemental sets of signals between said first and second units in both directions which sequence includes said second and additional sets of signals alternating with said supplemental sets of signals and transferring data signals therebetween during said alternation.

31. The method set forth in claim 30 further including the steps of:
continuously supplying a constant signal from said first to said second unit and including the steps of controlling said second unit by said first unit with said additional signal in combination with said first set of signals supplied from said first unit to said second unit for operating interaction between said units independent of said identical signals.

* * * * *